United States Patent
Callaghan et al.

(10) Patent No.: US 10,181,912 B1
(45) Date of Patent: Jan. 15, 2019

(54) NETWORK LINK TESTING

(71) Applicant: Amazon Technologies, Inc., Seattle, WA (US)

(72) Inventors: Stephen Callaghan, Seattle, WA (US); Minsung Kim, San Jose, CA (US); Leonard Thomas Tracy, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 15/055,408

(22) Filed: Feb. 26, 2016

(51) Int. Cl.
*H04L 12/26* (2006.01)
*H04B 17/00* (2015.01)
*H04L 12/939* (2013.01)

(52) U.S. Cl.
CPC ....... *H04B 17/0085* (2013.01); *H04L 49/555* (2013.01)

(58) Field of Classification Search
CPC .................................. H04B 17/0085
See application file for complete search history.

(56) References Cited

U.S. PATENT DOCUMENTS

| | | | | |
|---|---|---|---|---|
| 8,139,492 B1* | 3/2012 | Peterson | ................. | H04L 45/00 370/238 |
| 2013/0070619 A1* | 3/2013 | Anthony, Jr. | ......... | H04W 24/02 370/252 |
| 2013/0215752 A1* | 8/2013 | Hidai | ...................... | H04L 43/04 370/235 |
| 2013/0298236 A1* | 11/2013 | Smith | ................. | H04L 63/1491 726/23 |
| 2013/0322285 A1* | 12/2013 | Fidler | ................. | H04L 43/0882 370/252 |
| 2014/0115145 A1* | 4/2014 | Monk | ..................... | H04L 43/04 709/224 |
| 2015/0222502 A1* | 8/2015 | Fidler | ................. | H04L 41/5038 370/252 |

* cited by examiner

*Primary Examiner* — Gerald A Smarth
(74) *Attorney, Agent, or Firm* — Klarquist Sparkman, LLP

(57) ABSTRACT

Network links are exercised by transmitting network frames across the links at a threshold level of network traffic by filling unutilized bandwidth with test frames. By increasing network traffic across the links, errors are increased and easier to detect. The test frames can be given lower priority than customer traffic so as not to impact the test traffic. The test frames can be designed such that they are dropped upon receipt by another network switch.

17 Claims, 8 Drawing Sheets

NETWORK LINK TESTING

BACKGROUND

Traffic on the Internet has quickly grown and continues to expand at unprecedented rates. Network devices, such as network switches, play a critical role in sustaining that growth. Data to be passed by switches is generally divided into a series of packets that can be transmitted between devices. Packets include control information and payload data. The control information includes information used to deliver the payload data. For example, control information can include source and destination network addresses, packet sequencing identification, error detection codes, and the like.

Generally, network devices have two primary planes: a control plane and a data plane. The control plane is a management plane that configures the data plane. The data plane receives packets on input ports and transmits the received packets to output ports based on the configuration. Communication between the control plane and data plane can be accomplished through a communications bus (e.g., PCIe).

A network link includes a physical interconnection (e.g., a cable) between network devices, as well as layer 1 hardware (e.g., an Ethernet card) and possibly other hardware in the data plane of the network device (e.g., layer 2 and layer 3 hardware).

Network traffic monitoring can be used to check for errors in the network links by requesting error information from network devices and checking if the errors exceed threshold levels. However, if network traffic on the link is low, it is difficult to test the network links efficiently and errors often go unnoticed.

DETAILED DESCRIPTION

In one embodiment, network links are exercised by transmitting network frames across the links at 100% utilization or some other threshold level by filling unutilized bandwidth with test frames. By increasing network traffic across the links, errors are increased and easier to detect. The test frames can be used, for example, to test layer 2 traffic across network links. The test frames can be given the lowest class of traffic, so as to keep the test frames at a lower priority than customer traffic. In such a case, the test frames are dropped in favor of customer frames so that the customer frames are not impacted by the test traffic.

Figure 1:
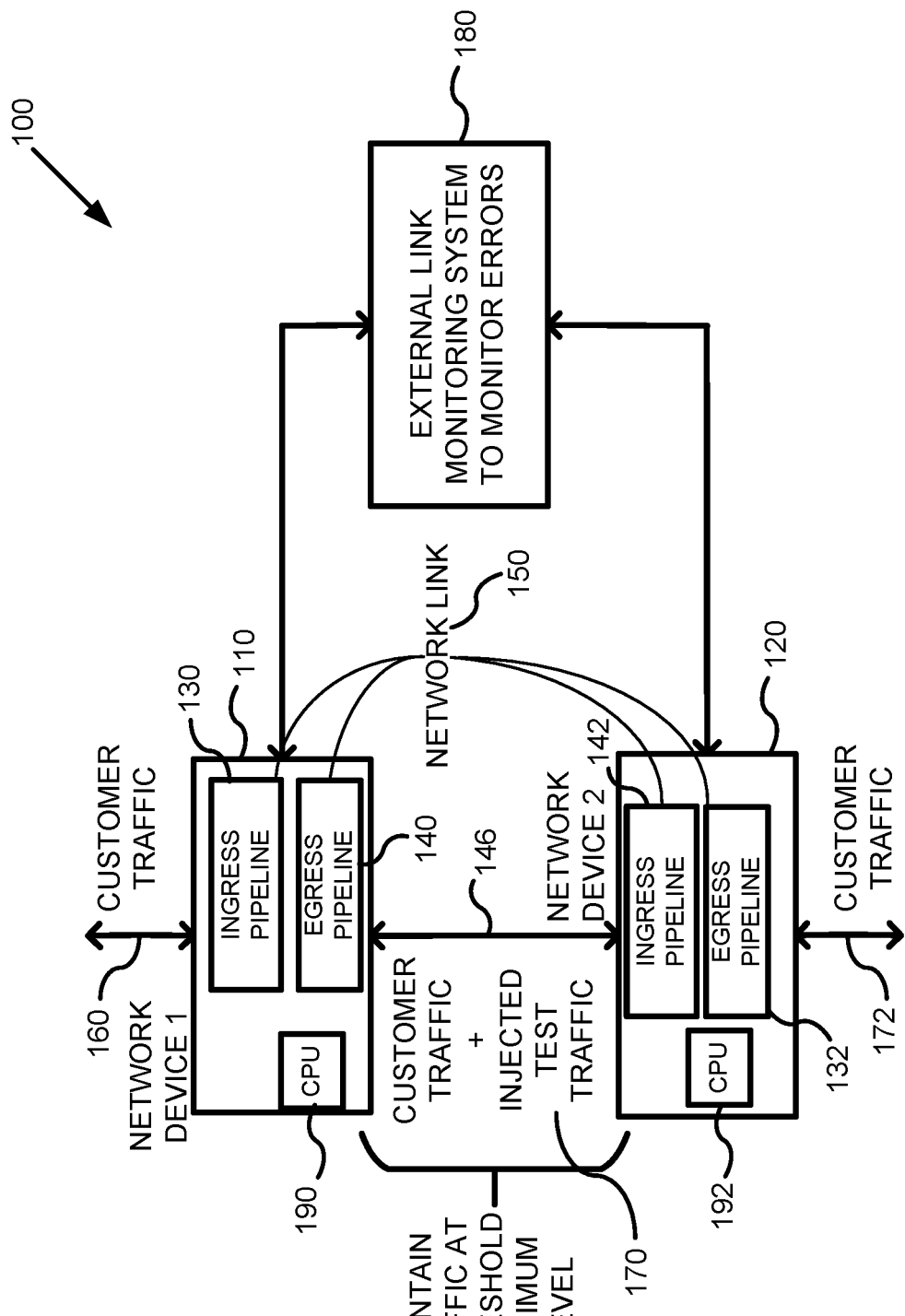
FIG. 1 is an example system diagram for testing network links using injected test traffic transmitted across a network link.

FIG. 1 is a system diagram illustrating one embodiment for testing network links on a network 100. The network 100 includes multiple network devices such as network device 1 shown at 110 and network device 2 shown at 120. The network devices 110, 120 can be a wide variety of different networking hardware including gateways, routers, switches, bridges, hubs, load balancers, and firewalls. In the case of switches, the switches can be layer 2 switches, layer 3 switches or a combination thereof. Other network devices can be only layer 1 devices. Other networking devices can also be used. Additional hardware within the network devices can include access control list (ACL) hardware. In the illustrated embodiment, the network devices 110, 120 are routers including switching hardware including an ingress pipeline 130, 142 and an egress pipeline 140, 132. The pipelines can include layer 2, layer 3, and ACL hardware. Typically the combination of this hardware is in an application-specific integrated circuit (ASIC), but other hardware devices can be used such as Field Programmable Gate Arrays (FPGAs) or Network Processing Units (NPUs). The egress pipelines 140, 132 can include a physical layer for coupling together the network devices. In some embodiments the physical layer can include an Ethernet card (or other network card types) with appropriate cabling connectors for connecting a cable 146 coupled between the network devices. The cable can be a wide variety of networking cables including, but not limited to, coaxial cable, optical fiber cable, and twisted pair cables. The network devices 110, 120 are typically separated by several meters or much longer distances depending on the particular configuration. However, in the illustrated configuration, the network devices 110, 120 are considered adjacent devices for purposes of a network protocol. The ingress pipelines 130, 142 and egress pipelines 140, 132 can include any of a variety of different possible configurations of layer 1, layer 2, and layer 3 components. For example, the network device 110 may include only the layer 1 hardware or some other combination. A connection between the network device 110 and the network device 120 establishes a network link 150 there between. The network link typically includes the cabling 146 and at least the egress pipeline 140 and the ingress pipeline 142. However, other portions of the ingress pipeline 130 and the egress pipeline 132 can be included in the network link. Each portion of the network link that is included can be considered an "element" of the network link. Which hardware is included in the network link depends on the design and which hardware is to be tested. Each network device 110, 120 can also include a controller, such as a CPU 190, 192.

As shown at 160, customer traffic can be considered real network packets that are transmitted through the network using the network devices 110, 120 to a final destination (not shown). Typically, the customer traffic 160 is below 100 percent utilization of the network device 110. In such a case, additional test traffic shown at 170 can be injected by either network device 110, network device 120 or a combination thereof so as to maintain traffic across the network link at a threshold minimum level. As shown at 172, the customer traffic is transmitted through the network device 120, but the injected test traffic from network device 110 is dropped once it reaches the network device 120. Likewise, injected test traffic from network device 120 is dropped once it reaches network device 110. Thus, the customer traffic is intermingled with test traffic to test a full pathway between the network devices 110, 120 with no impact to customers. More specifically, the customer traffic entering and exiting from the network device 110, as shown at 160, is the same as the customer traffic shown exiting network device 120 at 172. However, the level of traffic between the two devices is increased by the injected test traffic 170. There are numerous ways to ensure that the injected test traffic 170 is dropped by the network devices once received. One option is to make the adjacent network device the final destination for the injected test traffic 170. For example, network device 110 can inject a packet having a final destination of network device 120 and once received by network device 120 it will be dropped. Another example is to use a time-to-live parameter in the network packet and set it to 1 indicating that the packet can travel one hop in the computer network before being terminated. Another option is to use a reserved bit in a packet header. Still another option is to use differentiated services code point (DSCP) and provide the appropriate level to ensure that the packet is discarded.

An external link monitoring system 180 can be used to monitor the errors generated by the network traffic across the network link 150. The external link monitoring system 180 is coupled to both network devices 110, 120 and communicates with those devices so as to extract any error information. Different protocols can be used so as to extract the error information, such as through polling the network devices 110, 120 or by receiving periodic pushes of information from the network devices 110, 120. Due to the increased traffic flow across the network link 150, the external link monitoring system 180 can more effectively detect errors that are occurring across the network link 150. Although the diagram of FIG. 1 shows only two network devices coupled together, typically each network device is connected to multiple other adjacent network devices such as four different network devices. In such a case, the customer traffic and injected test traffic occurs on each different link between the network devices.

Figure 2:
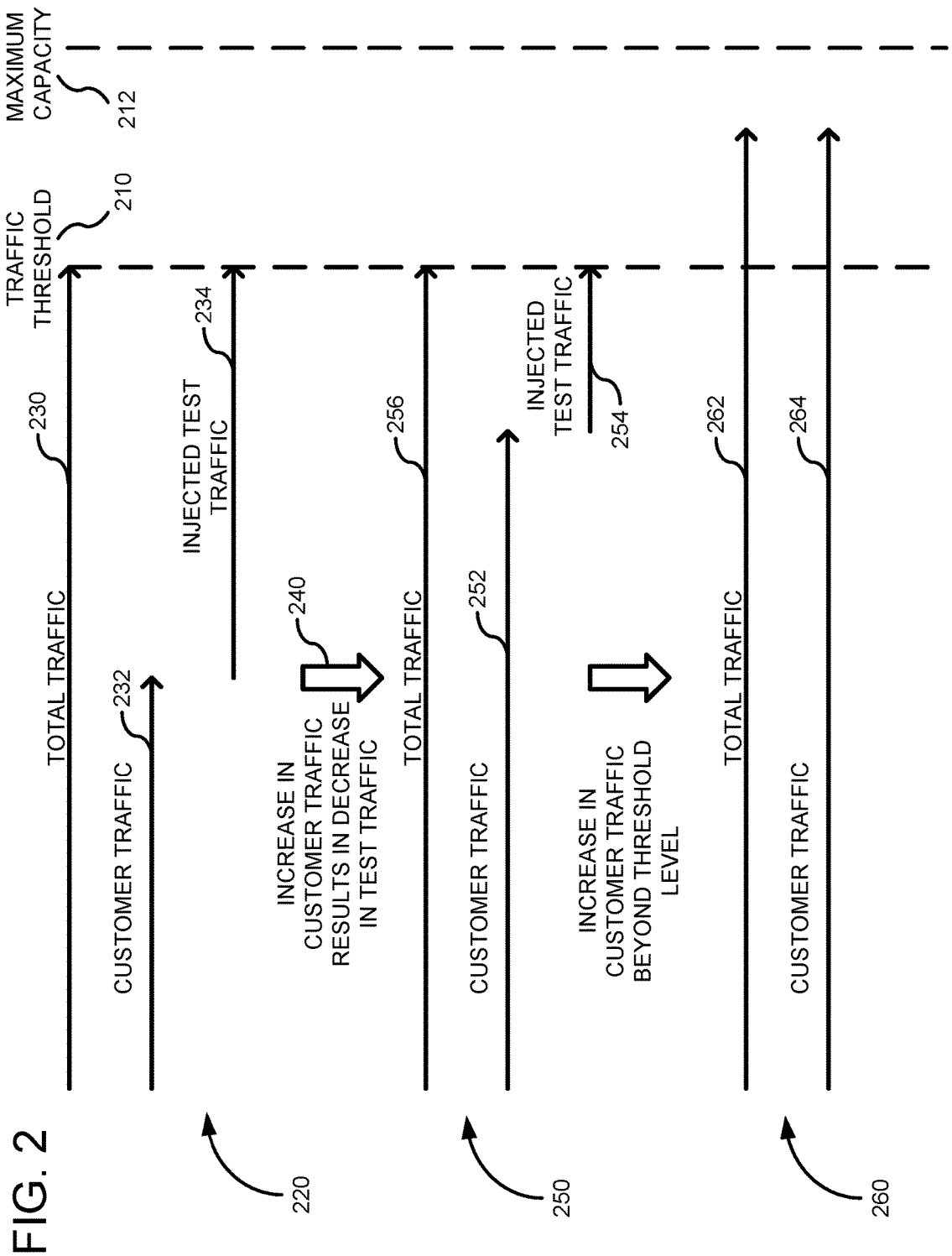
FIG. 2 is a diagram illustrating how injected test traffic is modified so that a total of customer traffic and test traffic is maintained at a predetermined traffic threshold.

FIG. 2 is a diagram illustrating how injected test traffic can be modified and given less priority than customer traffic so as to maintain a traffic threshold level. A traffic threshold 210 is shown as being less than a maximum capacity 212. However the traffic threshold can be modified so as to be equal to the maximum capacity 212 or any percentage value of the maximum capacity. An example traffic threshold can be between 50 to 75 percent of the maximum capacity 212. The traffic threshold 210 can be modified by an administrator of the network and can be set to any level depending on the desired implementation. During a first period of time shown generally at 220, the total network traffic transmitted through a network device is shown at 230 as being equal to the traffic threshold 210. The total network traffic 230 is a combination of customer traffic 232 and injected test traffic 234. As shown by arrow 240, as customer traffic is increased, the corresponding injected test traffic is decreased. More specifically, during a second period of time shown at 250, the customer traffic 252 is increased with respect to the customer traffic previously shown at 232. Likewise, the injected test traffic 254 is reduced with respect to its corresponding previous value shown at 234 so as to maintain the total traffic 256 at the traffic threshold 210. In this regard, the customer traffic is given priority over test traffic so that customer traffic is not negatively impacted by injecting the test traffic. In a final period of time shown at 260, the customer traffic increases beyond the threshold 210. In this case, the total traffic 262 can be equal to the customer traffic 264, which can exceed the traffic threshold 210. Notably, the injected test traffic is not shown as the network device determines that no test traffic needs to be injected when the customer traffic exceeds the traffic threshold 210.

Figure 3:
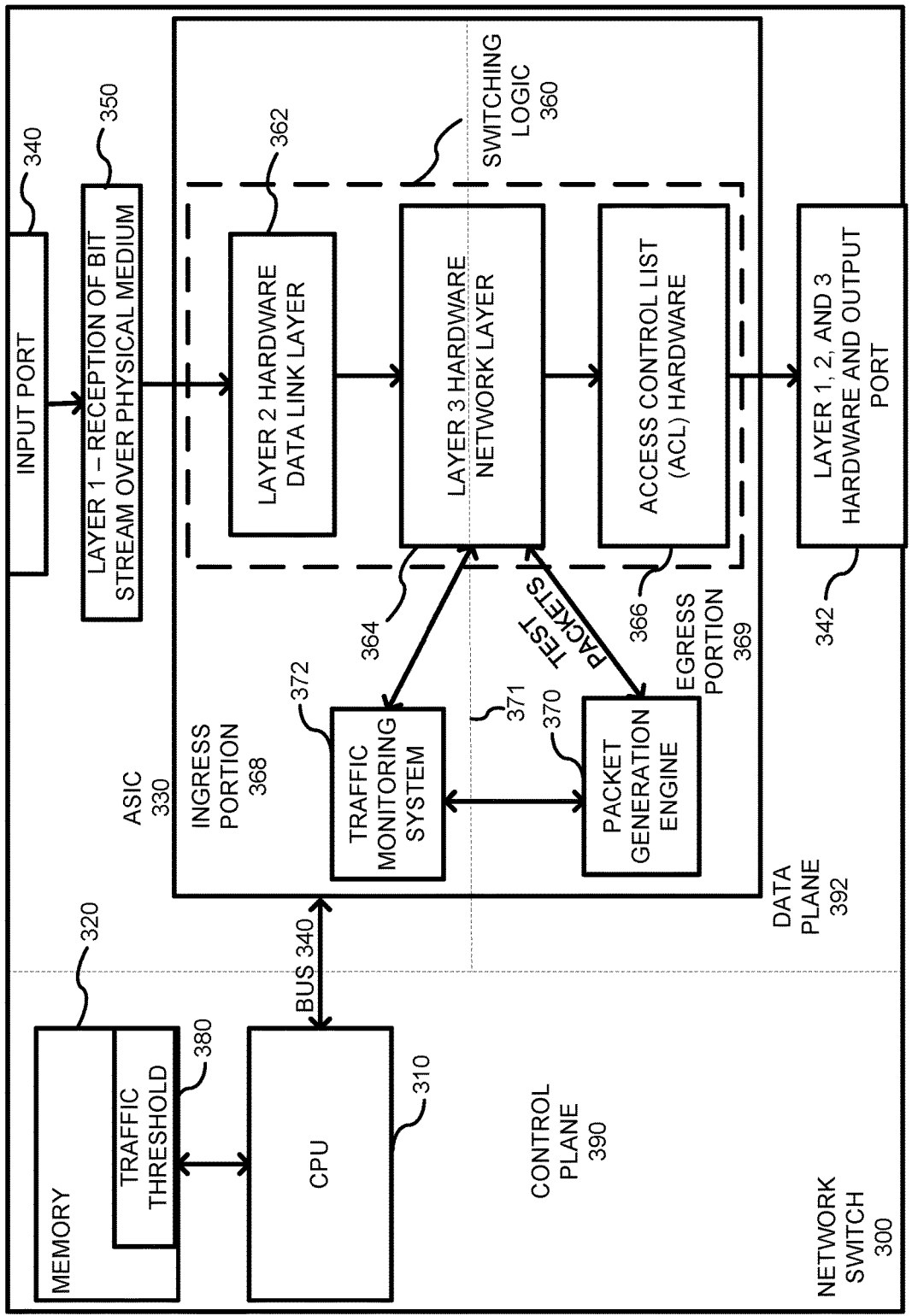
FIG. 3 shows further details of an embodiment of a network switch including layer 2 and layer 3 switching hardware, wherein the network switch includes a packet generation engine for injecting network traffic and wherein traffic monitoring is positioned within a data plane of the network switch.

FIG. 3 shows a detailed example of an embodiment of a network switch 300. In this embodiment, a CPU 310 is coupled to a memory 320 and an Application Specific Integrated Circuit (ASIC) 330 through a bus 340 (various protocols and bus types can be used). The ASIC 330 is positioned between an input port 340 and an output port 342, which are typically adapted to receive network cables, such as Ethernet cables. The ASIC 330 can be a single ASIC or divided into multiple integrated circuits. Layer 1 hardware 350 is also positioned between the input port 340 and the ASIC 330. The layer 1 hardware 350 can include a networking card, such as an Ethernet card, and is used to receive a bit stream over the physical medium.

The ASIC 330 can include switching logic 360. The switching logic 360 can include multiple different hardware logic blocks including a Layer 2 hardware block 362, a Layer 3 hardware block 364, and an ACL hardware block 366. The layer 2 hardware block 362 relates to an Ethernet layer and can forward packets based on MAC tables. The layer 3 hardware block 364 relates to forwarding based on a prefix match of an IP address. The ACL block 366 relates to permissions and can include rules whether to drop packets. The different hardware blocks can be coupled in series and additional hardware blocks can be added based on the design. Packets pass from the input port 340 to the output port 342 in accordance with the configuration of the hardware logic blocks 362, 364, 366. Although only a single input and output port are shown, typically the ASIC 330 controls multiple ports (e.g., 4 input ports and 4 output ports). The switching logic 360 can be logically divided into an ingress portion 368 and an egress portion 369, as shown by line 371.

The ASIC 330 also includes a packet generation engine 370 that can be used to inject test packets into the egress portion 369 of the switching logic 360. If desired, the packet generation engine 370 can inject the test packets into other hardware layers, such as the layers within the ingress portion 368. The test packets are faux packets as they are not actual customer traffic that traverses the network. Instead, the test packets typically travel to an adjacent network device before being dropped. As previously described, there are numerous techniques that can be used to ensure the faux packet is dropped, such as setting the appropriate time-to-live parameter, etc. The packet generation engine 370 can be responsive to a traffic monitoring system 372 that monitors an amount of network packets passing through the ASIC and reports the same to the packet generation engine 370. In turn, the packet generation engine 370 can compare the total traffic passing through the network switch 300 to a traffic threshold 380 stored in the memory 320 and passed to the packet generation engine 370 via the CPU 310.

The network switch 300 includes a control plane 390 and a data plane 392. The control plane 390 is generally a management layer for configuring, updating, and controlling the data plane 392, which transmits network packets. The control plane includes the controller 310, which can be a Central Processing Unit (CPU), processor, microcontroller, or any hardware logic capable of configuring the data plane. The communications bus 340 allows communications between the controller 310 and the data plane 392. The communications bus 340 can be any desired bus type, such as PCI, PCIe, AGP, etc.

The network link can include any of the hardware components within the switching logic 360 including the layer 2 hardware 362, the layer 3 hardware 364 and/or the ACL hardware 366. Each of these hardware blocks and others, such as the layer 1 hardware 350, can maintain counts for errors that occur, and such counts can be passed to the CPU 310 to be reported external to the network switch 300, such as to the external link monitoring system 180 of FIG. 1. The errors can be used to detect and correct deficiencies in the network switch 300.

Figure 4:
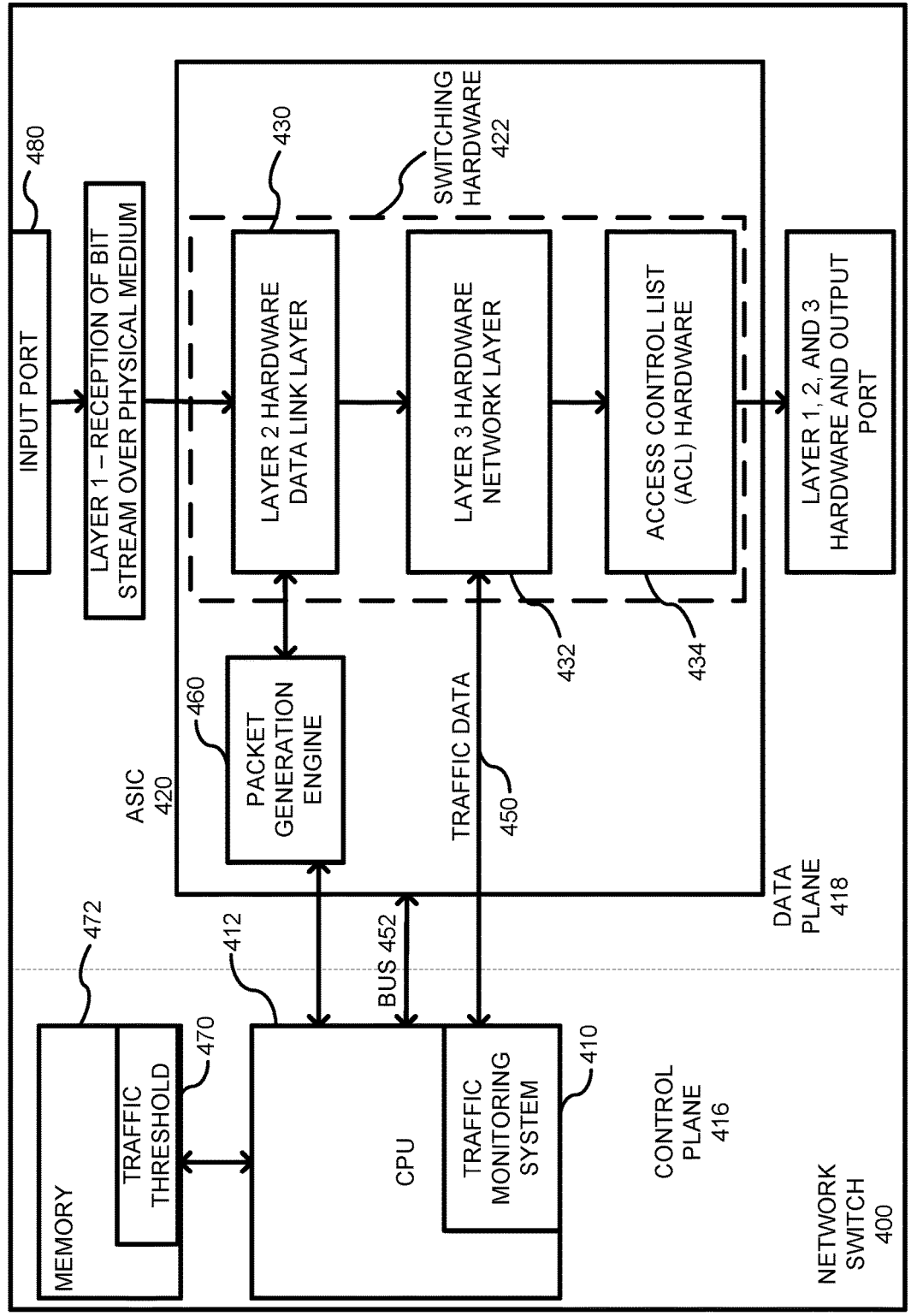
FIG. 4 shows another embodiment of a network switch wherein traffic monitoring occurs in a control plane of the network switch.

FIG. 4 shows another embodiment of a network switch wherein traffic monitoring occurs in a control plane of the network switch. In this embodiment, the network switch 400 is similar to the network switch 300 (FIG. 3) except that a traffic monitoring system 410 is implemented in software within a CPU 412 within a control plane 416. A data plane 418 includes an ASIC 420 including switching hardware 422 for switching network packets received by the network switch 400. The switching hardware 422 includes layer 2 hardware 430, layer 3 hardware 432, and ACL hardware 434 similar to the embodiment of FIG. 3. However, instead of the traffic monitoring system being performed in hardware within the ASIC 420, the traffic monitoring system 410 is implemented in software within the CPU 412 by having a communication path 450 between the CPU and the layer 3 hardware 432. Although a separate communication line is shown at 450 coupling the layer 3 hardware to the CPU 412, such communications can occur through a bus 452 coupling the CPU 412 to the ASIC 420. Via the communication path 450, the traffic monitoring system 410 monitors an amount of network packets passing through the layer 3 hardware 432. Once the traffic monitoring system 410 determines that additional test packets are to be injected into the traffic stream, the CPU can instruct a packet generation engine 460 to generate test packets that are then inserted into the layer 2 hardware 430. In this example, the packet generation engine is shown in an ingress portion of the ASIC 420, but could be positioned in the egress portion, as is shown in FIG. 3. Accordingly, the traffic monitoring system 410 can compare the traffic data on communication path 450 received from the layer 3 hardware and compare it to a traffic threshold 470 stored in memory 472 coupled to the CPU 412. When traffic data indicates that overall network traffic is below the traffic threshold, the traffic monitoring system 410 can control the packet generation engine 460 so that it generates additional test traffic to increase the level of traffic until the traffic threshold is reached. Likewise, if additional traffic is received on an input port 480 such that the traffic exceeds the traffic threshold 470, the traffic monitoring system 410 can instruct the packet generation engine 460 to decrease the amount of test packets that are being generated. Thus, the traffic monitoring system 410 can adaptively control the packet generation engine 460 so as to maintain the overall traffic level through the network switch 400 at the traffic threshold 470. As previously described, the test packets can be considered faux packets that are generally active until received by an adjacent neighbor switch. The neighbor switch can then discard the packets.

Figure 5:
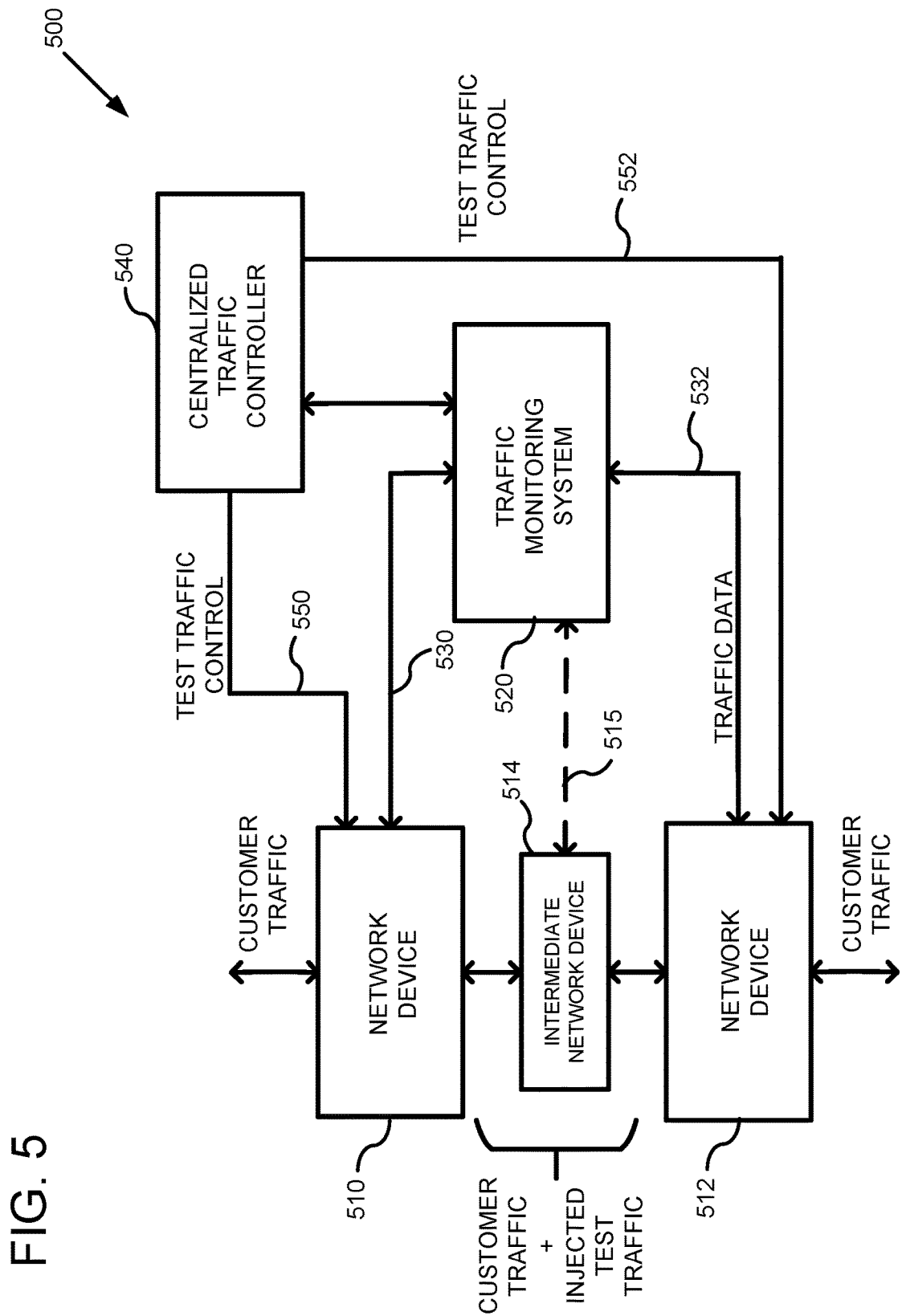
FIG. 5 shows another embodiment wherein traffic monitoring and traffic control is external to the network devices.

FIG. 5 shows another embodiment where network monitoring and traffic control is external to the network switches. A system 500 includes network devices 510 and 512, both of which are coupled to a traffic monitoring system 520. Thus, instead of having the traffic monitoring system within each of the network devices 510, 512, the traffic monitoring system 520 is positioned external to the network devices and can receive traffic data from the network devices using push or pull data acquisition techniques. As previously described, the network devices 510, 512 can be any of a variety of network devices including, but not limited to, routers, switches, firewalls, etc. An intermediate network device 514 can also be positioned between the network devices 510, 512 and can simply pass the network traffic. The network device 514 can also be coupled to the traffic monitoring system, but, as indicated by dashed lines 515, this connection can be eliminated.

In response to receiving the traffic data 530, 532, the traffic monitoring system 520 can inform a centralized traffic controller 540 of the network traffic on the devices 510 and 512. In response, the centralized traffic controller 540 can transmit control signals 550, 552 to control an amount of packets that are injected into the network traffic passing through the devices 510, 512. Typically, the traffic monitoring system 520 and the centralized traffic controller 540 are implemented on separate server computers. In one example, using the embodiment of FIG. 4, the test traffic control signal 550 can be received by a CPU in the control plane, which can then instruct a packet generation engine within the data plane of the network device to either increase a number of packets or decrease a number of packets based on the level of traffic passing through the network devices. Although not shown, an external link monitoring system, similar to that shown at 180 in FIG. 1, can be used to monitor traffic passing through the network devices and to detect error conditions in those devices.

Figure 6:
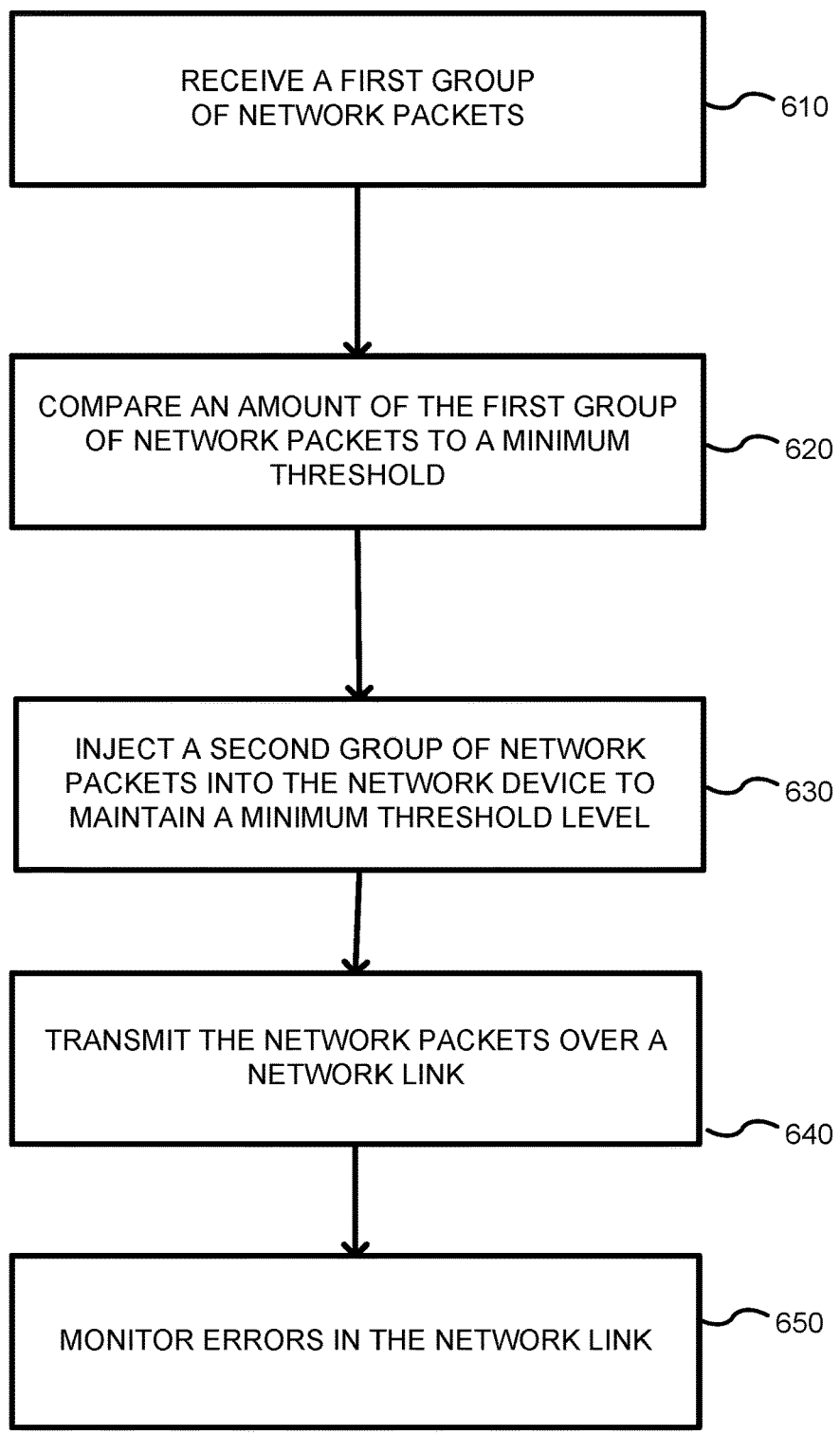
FIG. 6 is a flowchart according to one embodiment for testing network links.

FIG. 6 is a flowchart according to one embodiment for testing network links. In process block 610, a first group of network packets is received. For example, turning to an embodiment of FIG. 3, the first group of network packets can be received in the network switch 300 on the input port 340. Thus, the first group of network packets can be considered real packets or customer packets that the network switch 300 transmits towards their final destination in a network. Alternatively, the first group of network packets can be a combination of both faux packets and real packets such as is detected by the traffic monitoring system 372 from the layer 3 hardware 364. In either case, the first group of network packets can be compared (process block 620) to a minimum threshold level of network packets to be transmitted through a link. The link can be partially within the network device and partially outside the network device. For example, the network device can include four different ports, each one being associated with a different link. By controlling packets through one of the ports, the network device can control packets transmitted over the link. As previously described, the threshold level of network packets can be a constant that is stored in memory within the network switch 300 and can be provided by an administrator of the network. In process block 630, a second group of network packets is injected into the network device to maintain a traffic level at the minimum threshold level. For example, returning to FIG. 3, the packet generation engine 370 can inject test packets into the layer 2 hardware so as to maintain the minimum threshold level. In other cases, if the minimum threshold level is already being reached, the packet generation engine 370 can be instructed to reduce the number of network packets being generated internal to the network switch. In process block 640, the network packets are transmitted over a network link. Thus, both the first group and second group of network packets are transmitted from the output port 342 over a network link to be received by an adjacent network switch. In other embodiments, additional links can be tested with the same faux network packets by merely changing the destination or time-to-live parameter so that multiple network devices and multiple network links can be tested using a single faux test packet. In whatever network device receives the faux packet, the packets are generally discarded upon receipt and only the customer packets are then transmitted on to other destinations within the network. Errors caused by both the first group and second group of network packets can be monitored (process block 650) such as by an external link monitoring system 180 shown in FIG. 1. Thus, the combination of the first group of network packets and the second group of network packets assist in generating sufficient network traffic so as to adequately test the network links.

Figure 7:
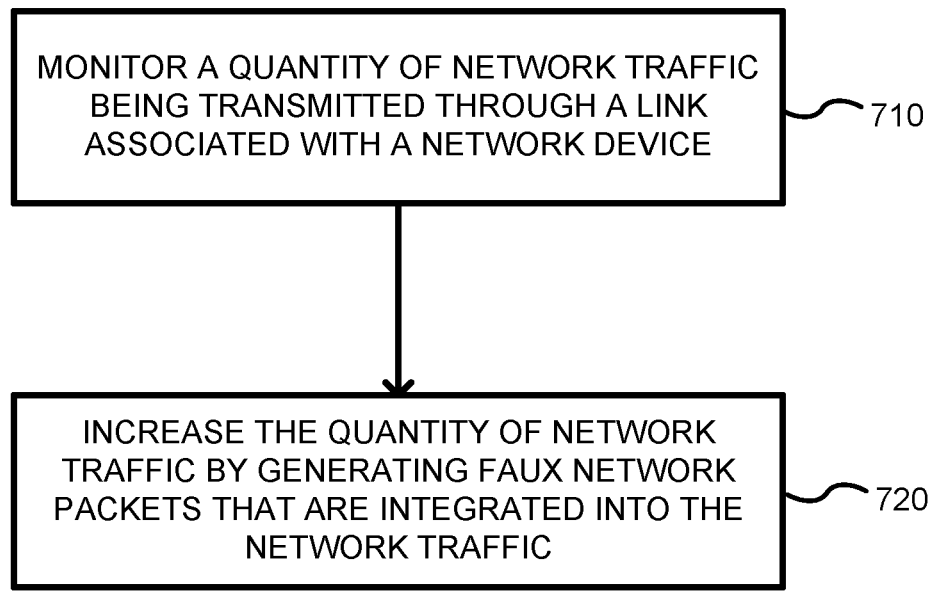
FIG. 7 is a flowchart according to another embodiment for testing network links.

FIG. 7 is a flowchart according to another embodiment for testing network links. In process block 710, a quantity of network traffic being transmitted through a link associated with a network device is monitored. As previously indicated, the monitoring of the network traffic can be within a data plane or control plane of a network device. Alternatively, the monitoring can be external to the network device. In process block 720, the quantity of the network traffic is increased by generating faux network packets that are integrated into the network traffic. For example, a packet generation engine can be controlled either within the data plane of the network switch, or by the control plane of the network switch so as to generate new test packets to be injected into the network traffic stream. In alternative embodiments, the packet generation engine can be responsive to external control from devices outside of the network switch. Alternatively, if the threshold level of network traffic is exceeded, the packet generation engine can reduce the quantity of faux packets that are injected into the traffic stream so as to maintain the minimum threshold level.

Figure 8:
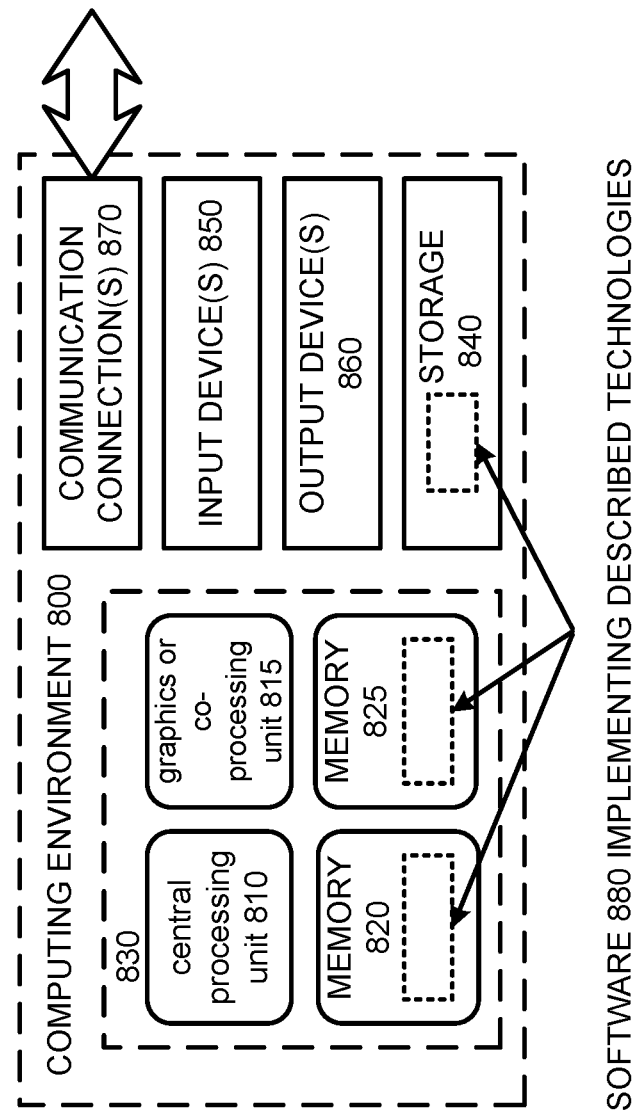
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800. The computing environment 800 can be used in the embodiments described herein, such as for the external link monitoring system, the traffic monitoring system or the centralized traffic controller.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of testing network links on a network, comprising:
    receiving a first group of customer network packets in a network device;
    comparing an amount of the first group of customer network packets to a minimum threshold level of network packets to be transmitted through a network link on the network device;
    injecting a second group of test network packets into the network device so as to increase a total network packets transmitted by the network device to the minimum threshold level, the total network packets including the first group of the customer network packets and the second group of the test network packets; transmitting the total network packets from the network device over one or more elements of the network link on the network; and
    monitoring errors in the network link caused by the first and second groups of network packets.

2. The method of claim 1, further including receiving an increase in the first group of customer network packets and reducing the second group of test network packets so as to maintain the total network packets at the minimum threshold level.

3. The method of claim 1, wherein injecting the second group of test network packets includes generating the second group of test network packets within the network device to test the network link.

4. The method of claim 1, wherein the network device is a first network device and wherein the second group of test network packets are discarded upon receipt at an adjacent network device to the first network device.

5. The method of claim 1, wherein the monitoring of the errors is performed by a link monitoring system external to the network device.

6. The method of claim 1, wherein the network device is a router, a switch, load balancer or a firewall.

7. A system for testing a network, comprising:
    a traffic monitoring system configured to monitor an amount of network packets being transmitted through a network link; and
    an integrated circuit including:
        a packet generation engine coupled to the traffic monitoring system, the packet generation engine being positioned within a network device and configured to generate test network packets to maintain network packets being transmitted by the network device to a minimum threshold so that a total packets transmitted by the network device includes a first group of customer packets and a second group of the test network packets monitored by the traffic monitoring system, wherein the network device is a first network device, and further including a second network device coupled to the first network device to form the network link, the second network device configured to count and discard the test network packets.

8. The system of claim 7, wherein the integrated circuit includes layer 1 hardware, layer 2 hardware, layer 3 hardware, or Access Control List hardware.

9. The system of claim 7, wherein the traffic monitoring system is within a control plane or a data plane of the network device including the integrated circuit.

10. The system of claim 7, wherein the traffic monitoring system is external to the network device that includes the integrated circuit and is coupled to a traffic controller, which is configured to control the packet generation engine.

11. The system of claim 7, wherein the traffic monitoring system is within the integrated circuit.

12. The system of claim 7, further including an external link monitoring system coupled to the first and second network devices to monitor errors in the network link.

13. The system of claim 7, wherein the packet generation engine adjusts an amount of the test network packets generated based upon giving priority to network packets that are received by the integrated circuit.

14. A computer-readable storage medium, which is non-transitory, including instructions that upon execution cause a computer system to:
    monitor a quantity of network traffic being transmitted through a link; and increase the quantity of network traffic being transmitted through the link by generating faux network packets, in a first network device, to be added to the network traffic to maintain the quantity of the network traffic at a minimum traffic threshold level, wherein the monitoring of the quantity of network traffic includes monitoring of real network packets and the faux network packets and discarding the faux network packets in a second network device coupled to the first network device.

15. The computer-readable storage medium according to claim 14, wherein the instructions, upon execution, further cause the computer system to:

adjust an amount of the faux network packets so as to give priority in the network traffic to the real network packets and maintain the quantity of network traffic at the minimum traffic threshold level.

16. The computer-readable storage medium according to claim 14, wherein the instructions, upon execution, further cause the computer system to:

monitor the network link for errors through a monitoring system coupled to both the first network device and the second network device.

17. The computer-readable storage medium according to claim 14, wherein the network device is a first network device and the network traffic is transmitted to a second network device through an intermediate network device positioned between the first and second network devices.

* * * * *